(12) United States Patent
Oh et al.

(10) Patent No.: US 11,192,300 B2
(45) Date of Patent: Dec. 7, 2021

(54) SYSTEM FOR AND METHOD OF MANUFACTURING THREE-DIMENSIONAL STRUCTURE

(71) Applicant: ELECTRONICS AND TELECOMMUNICATIONS RESEARCH INSTITUTE, Daejeon (KR)

(72) Inventors: Ji-Young Oh, Daejeon (KR); Yong Suk Yang, Daejeon (KR); Kyung Hyun Kim, Daejeon (KR); Kyu Sung Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/788,413

(22) Filed: Feb. 12, 2020

(65) Prior Publication Data

US 2020/0180223 A1 Jun. 11, 2020

Related U.S. Application Data

(62) Division of application No. 15/787,195, filed on Oct. 18, 2017, now abandoned.

(30) Foreign Application Priority Data

Dec. 14, 2016 (KR) .................. 10-2016-0170655
Jun. 8, 2017 (KR) .................. 10-2017-0071907

(51) Int. Cl.
*B29C 64/209* (2017.01)
*B29C 64/171* (2017.01)
(Continued)

(52) U.S. Cl.
CPC .......... *B29C 64/209* (2017.08); *B29C 64/106* (2017.08); *B29C 64/165* (2017.08);
(Continued)

(58) Field of Classification Search
None
See application file for complete search history.

(56) References Cited

U.S. PATENT DOCUMENTS 9,349,992 B2    5/2016  Cho et al.
10,618,217 B2 *  4/2020  Boyd, IV ............ B29C 64/106
(Continued)

FOREIGN PATENT DOCUMENTS

JP          07119064 B2   12/1995
JP           5774377 B2    9/2015
(Continued)

OTHER PUBLICATIONS

MakerBot. "Replicator 2X User Manual." MakerBot, 2012, downloads.makerbot.com/replicator2x/MakerBot_Replicator_2X_User_Manual.pdf. (Year: 2012).*

(Continued)

*Primary Examiner* — Alison L Hindenlang
*Assistant Examiner* — Andrés E. Behrens, Jr.
(74) *Attorney, Agent, or Firm* — Rabin & Berdo, P.C.

(57) ABSTRACT

Disclosed are a system for and a method of manufacturing a three-dimensional (3D) structure. The method may include injecting a fluid with a first pressure toward a surface of a first output layer to form a softening layer in the first output layer, injecting the fluid with a second pressure toward the softening layer to form an uneven structure in the softening layer, the second pressure being higher than the first pressure, and forming a second output layer on the softening layer with the uneven structure.

7 Claims, 21 Drawing Sheets

(51) Int. Cl.
  *B29C 64/165*   (2017.01)
  *B29C 64/241*   (2017.01)
  *B29C 64/106*   (2017.01)
  *B33Y 30/00*    (2015.01)
  *B33Y 10/00*    (2015.01)
  *B29C 64/159*   (2017.01)
  *B29C 64/321*   (2017.01)
  *B29C 64/236*   (2017.01)

(52) U.S. Cl.
  CPC .......... *B29C 64/171* (2017.08); *B29C 64/241* (2017.08); *B33Y 10/00* (2014.12); *B33Y 30/00* (2014.12); *B29C 64/159* (2017.08); *B29C 64/236* (2017.08); *B29C 64/321* (2017.08)

(56) References Cited

U.S. PATENT DOCUMENTS

| | | | | |
|---|---|---|---|---|
| 10,875,243 | B2* | 12/2020 | Cambron | B33Y 30/00 |
| 2010/0321448 | A1 | 12/2010 | Buestgens et al. | |
| 2014/0145160 | A1 | 5/2014 | Cho et al. | |
| 2015/0197063 | A1 | 7/2015 | Shinar et al. | |
| 2016/0075089 | A1* | 3/2016 | Duro Royo | B29C 64/106 264/308 |
| 2016/0218287 | A1* | 7/2016 | McAlpine | H01L 51/0004 |
| 2018/0071986 | A1* | 3/2018 | Buller | B28B 1/001 |
| 2018/0111313 | A1* | 4/2018 | Murao | B29C 64/112 |
| 2021/0031449 | A1* | 2/2021 | Belcher | B29C 64/209 |

FOREIGN PATENT DOCUMENTS

| | | |
|---|---|---|
| JP | 2016-160441 A | 9/2016 |
| KR | 10-1170301 B1 | 8/2012 |
| KR | 10-1506704 B1 | 3/2015 |
| KR | 10-2015-0077609 A | 7/2015 |
| KR | 10-1591438 B1 | 2/2016 |
| KR | 101648767 B1 * | 8/2016 |
| KR | 101648767 B1 | 8/2016 |
| WO | 2015193819 A3 | 12/2015 |
| WO | 2016196382 A1 | 12/2016 |

OTHER PUBLICATIONS

Abilgaziyev, A., et al. "Design and Development of Multi-Nozzle Extrusion System for 3D Printer." 2015 International Conference on Informatics, Electronics & Vision (ICIEV), Jun. 18, 2015, doi:10.1109/iciev.2015.7333982. (Year: 2015).*

RepRap. "Diamond Hotend." RepRap Wiki, Nov. 19, 2016, web.archive.org/web/20161119045820/reprap.org/wiki/Diamond_Hotend. (Year: 2016).*

Sukindar, Nor Aiman, et al. "Analyzing the Effect of Nozzle Diameter in Fused Deposition Modeling for Extruding Polylactic Acid Using Open Source 3D Printing." Jurnal Teknologi, vol. 78, No. 10, Sep. 29, 2016, doi: 10.11113/jt.v78.6265. (Year: 2016).*

KR-101,648,767 (Ho) Apr. 2015 (online machine translation), [Retrieved on Aug. 9, 2021]. Retrieved from: Espacenet (Year: 2015).*

* cited by examiner

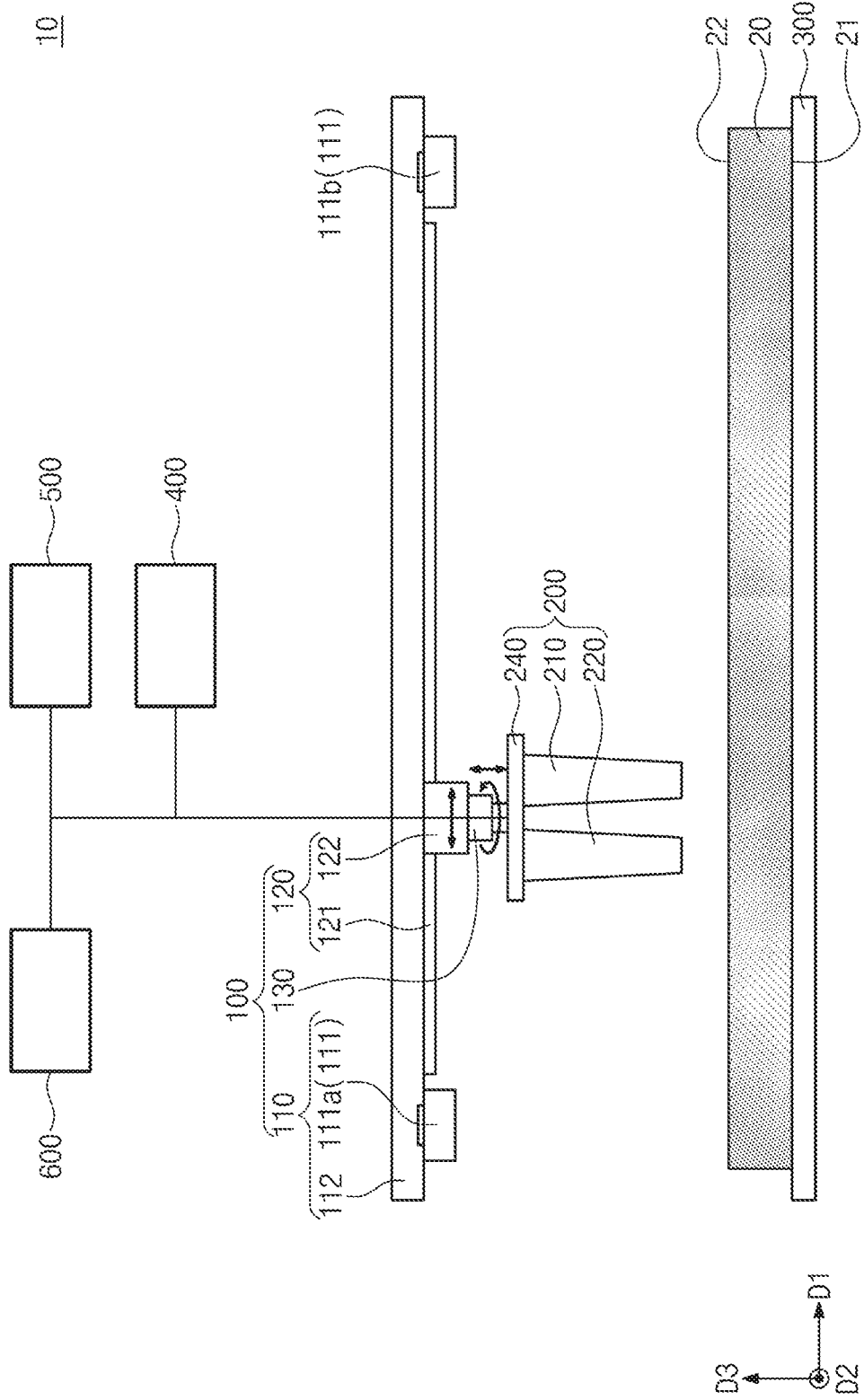

SYSTEM FOR AND METHOD OF MANUFACTURING THREE-DIMENSIONAL STRUCTURE

CROSS-REFERENCE TO RELATED APPLICATIONS

The present application is a divisional application of co-pending U.S. application Ser. No. 15/787,195, filed on Oct. 18, 2017, which claims priority under 35 U.S.C. § 119 to Korean Patent Application No. 10-2016-0170655, filed on Dec. 14, 2016, and No. 10-2017-0071907, filed on Jun. 8, 2017 in the Korean Intellectual Property Office, the entire contents of which are hereby incorporated by reference.

BACKGROUND OF THE INVENTION

The present disclosure relates to a system for and a method of manufacturing a three-dimensional (3D) structure, and in particular, to a system for and a method of manufacturing a 3D structure including a plurality of output layers which are adhered to each other with an increased adhesion strength.

In recent years, a three-dimensional (3D) structure manufacturing system (e.g., a 3D printer) for manufacturing a 3D structure based on 3D modeling has been widely used in various industries. Due to its wide applicability, the 3D structure manufacturing system is one of the future and emerging technologies that are being actively developed.

The 3D structure manufacturing system may be classified into two types: 1) a stacking type, in which a 3D structure is manufactured by three-dimensionally stacking two-dimensional structures, each of which is formed in a planar shape, and 2) a cutting type, in which a 3D structure is manufactured by cutting a bulk material. In the stacking type system, layers constituting a 3D structure are stacked one by one in a manner of hardening and stacking a powder or liquid layer, and a 3D structure manufactured by this method suffers from weakness in adhesion strength between output layers made of the same or different materials. Thus, researches are being conducted to enhance the adhesion strength between the output layers.

SUMMARY

Some embodiments of the inventive concept provide a system for and a method of manufacturing a three-dimensional structure including a plurality of output layers which are adhered to each other with an increased adhesion strength.

According to some embodiments of the inventive concept, a method of manufacturing a three-dimensional (3D) structure may include injecting a fluid with a first pressure toward a surface of a first output layer to form a softening layer in the first output layer, injecting the fluid with a second pressure toward the softening layer to form an uneven structure in the softening layer, the second pressure being higher than the first pressure, and forming a second output layer on the softening layer with the uneven structure.

In some embodiments, the fluid may have a temperature ranging from a softening point of the first output layer to a melting point of the first output layer.

In some embodiments, the softening layer with the uneven structure may include a recessed region, to which the fluid with the second pressure is injected, and a protruding region adjacent to the recessed region.

In some embodiments, a thickness of the protruding region may be larger than that of the recessed region.

In some embodiments, the fluid with the second pressure is injected with the fluid with the first pressure.

In some embodiments, an injection area of the fluid with the first pressure may be larger than that of the fluid with the second pressure.

In some embodiments, the method may further include injecting solution, in which metal particles are contained, toward the softening layer with the uneven structure.

In some embodiments, the second output layer and the metal particles may include the same metallic material.

In some embodiments, the fluid may include nitrogen gas ($N_2$) or air.

According to some embodiments of the inventive concept, a system for manufacturing a three-dimensional structure may include a supporting structure, a head unit spaced apart from the supporting structure, a head transporting part configured to move the head unit over the supporting structure, a first supplying part configured to supply a fluid to the head unit, and a second supplying part configured to supply a shaping material to the head unit. The head unit may include a first head part configured to inject the fluid toward the supporting structure with a first pressure and a second pressure higher than the first pressure, and a second head part configured to supply the shaping material toward the supporting structure.

In some embodiments, the first head part may include a first injection part configured to inject the fluid with the first pressure toward the supporting structure, and a second injection part configured to inject the fluid with the second pressure toward the supporting structure. The first injection part may be provided to enclose the second injection part.

In some embodiments, the first injection part may include at least one first inlet, which is connected to the first supplying part, and a plurality of first nozzles, which are spaced apart from the first inlet in a direction toward the supporting structure. The second injection part may include a second inlet, which is connected to the first supplying part, and a second nozzle, which is spaced apart from the second inlet in the direction toward the supporting structure. The second inlet and the second nozzle may be vertically overlapped with each other.

In some embodiments, the system may further include a third supplying part configured to supply solution, in which a metallic material is contained, to the head unit. The head unit may further include a third head part configured to inject the solution toward the supporting structure.

In some embodiments, the fluid may have a temperature ranging from a softening point of the shaping material to a melting point of the shaping material.

In some embodiments, the head unit may further include a circular-disk shaped connection plate connecting the first and second head parts to the head transporting part, and the head transporting part may be configured to rotate the connection plate.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIGS. 1A and 1B are schematic diagrams illustrating a three-dimensional (3D) structure manufacturing system according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown.

Figure 1B:
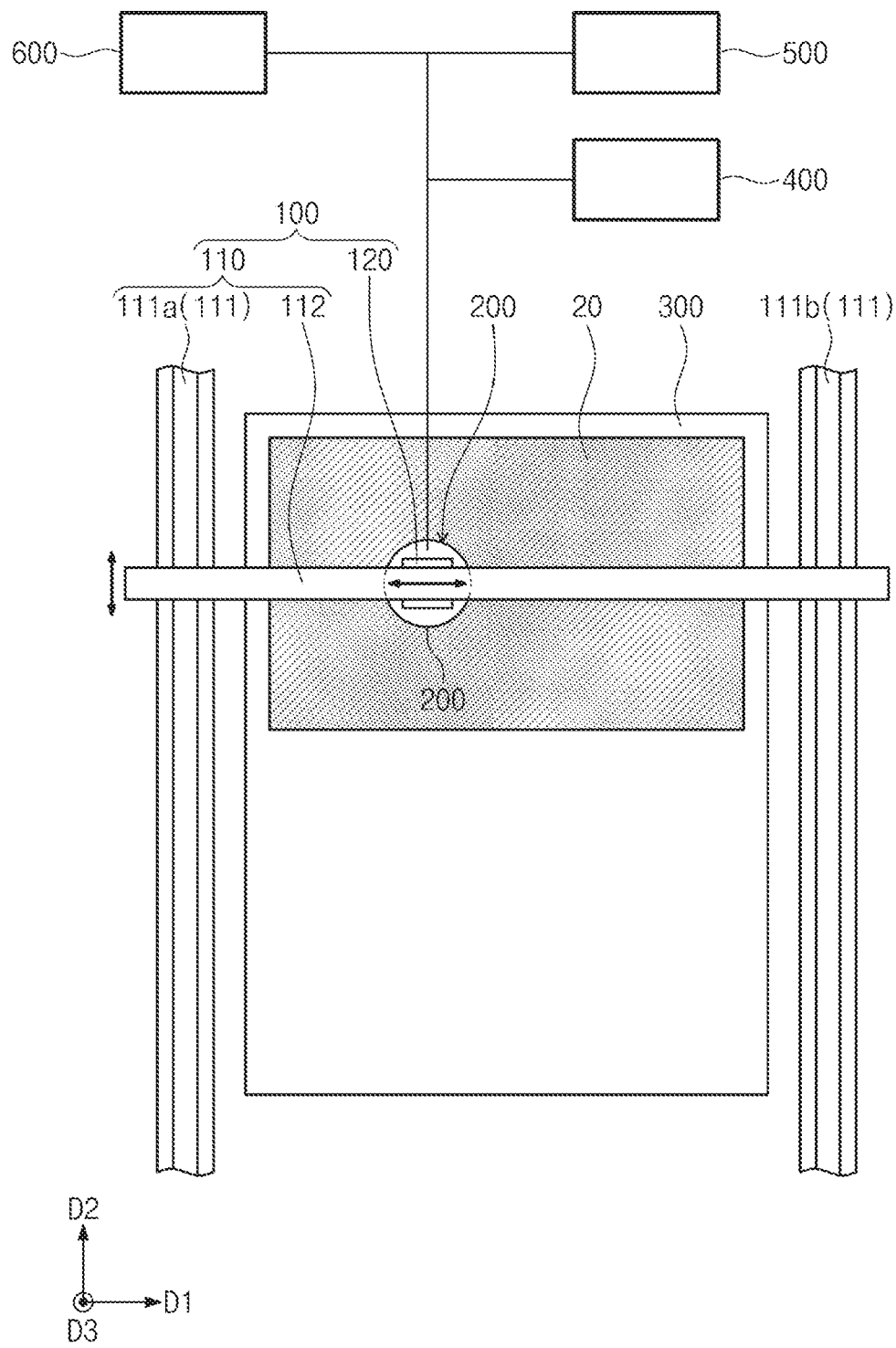
Figure 2:
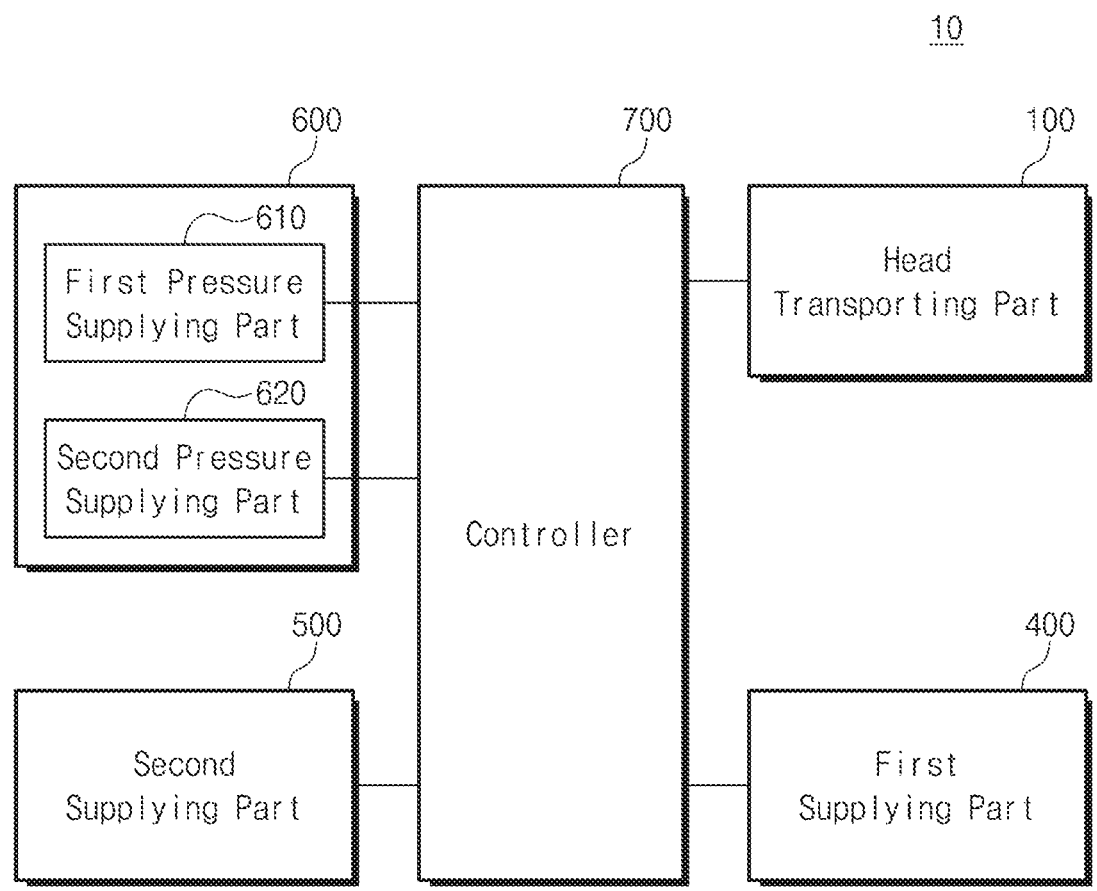
FIG. 2 is a block diagram of the 3D structure manufacturing system shown in FIGS. 1A and 1B.
Figure 3:
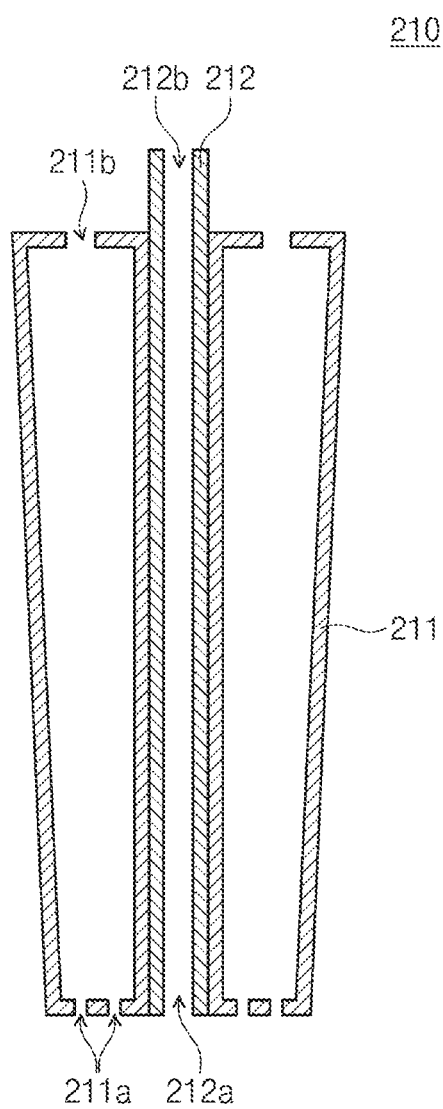
FIG. 3 is a sectional view of a first head part of FIG. 1A.
Figure 4:
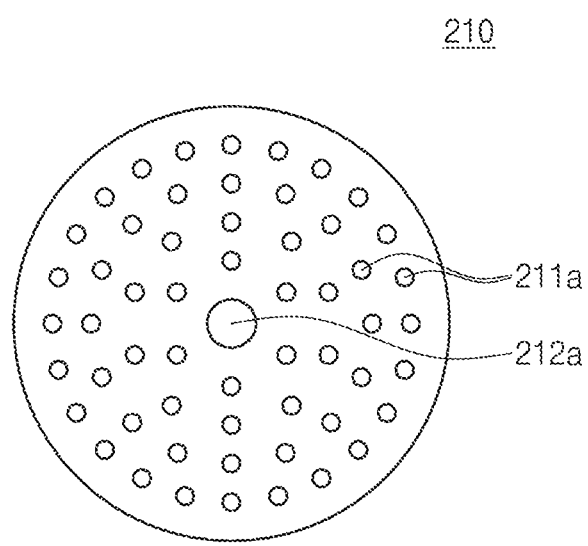
FIG. 4 is a bottom plan view of the first head part of FIG. 1A.

FIGS. 1A and 1B are schematic diagrams illustrating a three-dimensional (3D) structure manufacturing system according to some embodiments of the inventive concept. FIG. 2 is a block diagram of the 3D structure manufacturing system shown in FIGS. 1A and 1B. FIG. 3 is a sectional view of a first head part of FIG. 1A. FIG. 4 is a bottom plan view of the first head part of FIG. 1A.

Referring to FIGS. 1A, 1B, 2, 3, and 4, a 3D structure manufacturing system 10 according to some embodiments of the inventive concept may be configured to form a 3D structure on a first output layer 20. The 3D structure manufacturing system 10 may be, for example, a 3D printer. The 3D structure manufacturing system 10 may include a supporting structure 300, a head unit 200, a head transporting part 100, a first supplying part 400, a second supplying part 500, a pressure supplying part 600, and a controller 700.

The supporting structure 300 may be configured to support the 3D structure. For example, the supporting structure 300 may be used to support the first output layer 20. The first output layer 20 may be used as a lower portion of the 3D structure. For example, the first output layer 20 may have a single-layered structure or a multi-layered structure including a plurality of layers. The first output layer 20 may have a first surface 21 in contact with the supporting structure 300 and a second surface 22 facing the first surface 21. The first output layer 20 may be provided in such a way that the second surface 22 faces the head unit 200. A surface of the first output layer 20 may refer to the second surface 22. In some embodiments, the first output layer 20 may be formed of or include a thermo-plastic material. For example, the first output layer 20 may include an organic material. The supporting structure 300 may be located below the head unit 200.

The head unit 200 may be configured to inject fluid and a shaping material toward the first output layer 20 and/or the supporting structure 300. The head unit 200 may be spaced apart from the supporting structure 300 and/or the first output layer 20 in an upward direction. The head unit 200 may include a first head part 210, a second head part 220, and a connection plate 240.

The first head part 210 may be configured to inject a fluid toward the supporting structure 300 and/or the second surface 22 of the first output layer 20 with a first pressure and/or a second pressure. For example, the first head part 210 may be used to inject the fluid toward the second surface 22 of the first output layer 20 with the first pressure and/or the second pressure. The second pressure may be higher than the first pressure. The fluid may be prepared to have a temperature (hereinafter, a process temperature) that is higher than a softening point of the first output layer 20 and is lower than a melting point of the first output layer 20. That is, the process temperature may be within a range between the softening and melting points of the first output layer 20. In other words, the process temperature may be within a range between softening and melting points of a shaping material to be injected from the second head part 220.

The fluid to be injected from the first head part 210 may be used to soften the first output layer 20. The first head part 210 may be connected to the connection plate 240. As shown in FIG. 3, the first head part 210 may include a first injection part 211 and a second injection part 212. The first and second injection parts 211 and 212 will be described in more detail below.

Figure 8:
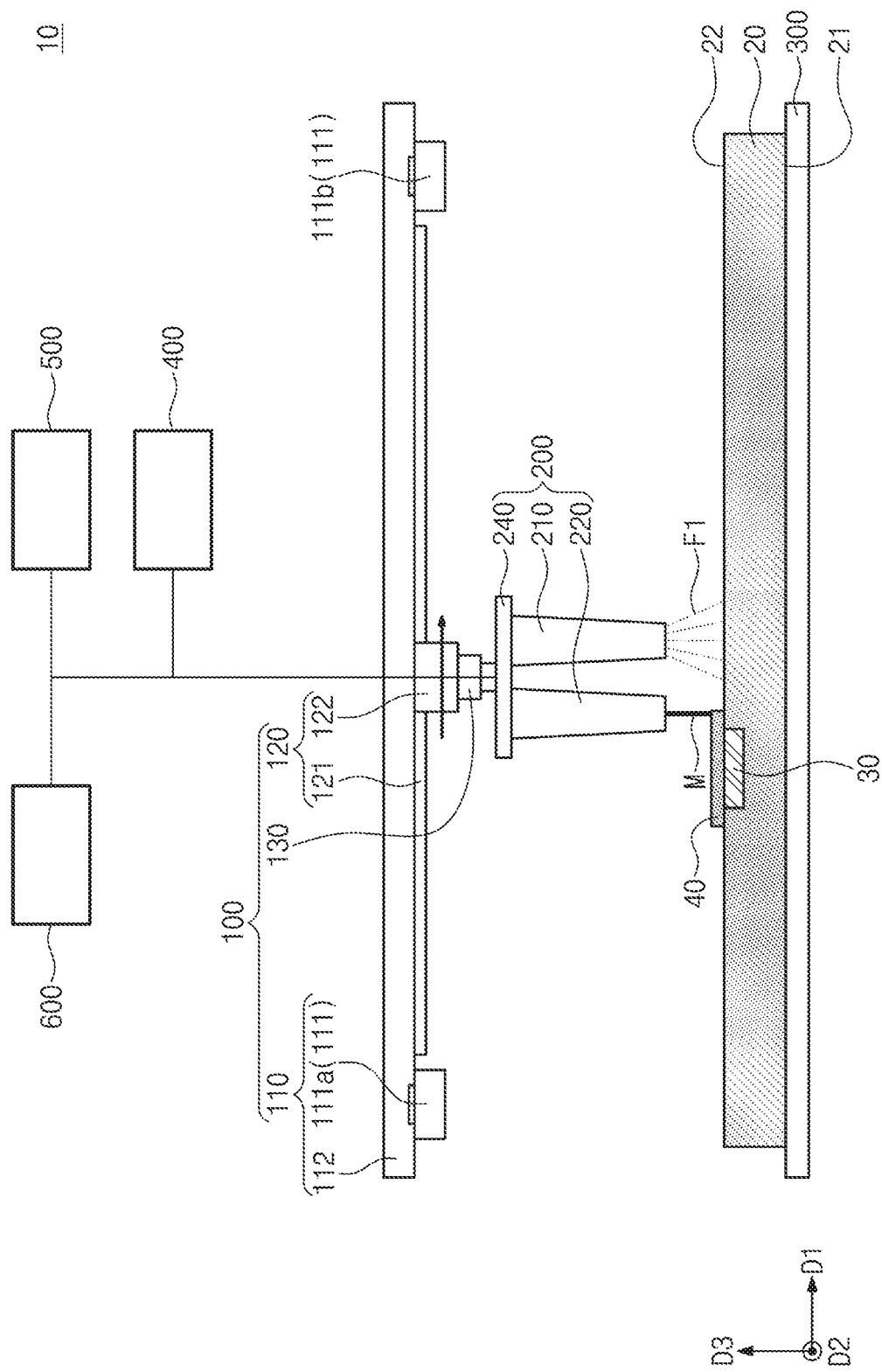

The second head part 220 may be configured to supply a shaping material toward the supporting structure 300 and/or the first output layer 20. Accordingly, a plurality of output layers may be stacked on the supporting structure 300. In other words, a 3D structure may be formed on the supporting structure 300. For example, the first output layer 20 may be formed on the supporting structure 300, and a second output layer 40 (e.g., see FIG. 8) may be formed on the first output layer 20. The second head part 220 may be connected to the connection plate 240. The second head part 220 may be spaced apart from the first head part 210.

The connection plate 240 may be connected to the first and second head parts 210 and 220. The connection plate 240 may be connected to a third transporting unit 130, which will be described below. In some embodiments, the connection plate 240 may be provided in the form of a circular plate. The first and second head parts 210 and 220 may be arranged along the circumference of the circular connection plate 240.

The head transporting part 100 may be configured to move the head unit 200 over the supporting structure 300 and/or the first output layer 20. For example, the head transporting part 100 may be configured to move the head unit 200 in X-, Y-, and Z-axes directions. Here, the X-axis direction may be referred to as a first direction D1, the Y-axis direction may be referred to as a second direction D2, and the Z-axis direction may be referred to as a third direction D3. The head transporting part 100 may include a first transporting unit 110, a second transporting unit 120, and a third transporting unit 130.

The first transporting unit 110 may be configured to move the head unit 200 in the second direction D2. The first transporting unit 110 may include a first guide part 111, a first transporting tray 112, and a first driving part (not shown).

The first guide part 111 may include a first rail 111a and a second rail 111b. The first rail 111a may be spaced apart from the second rail 111b in the first direction D1. The first and second rails 111a and 111b may be elongated in the second direction D2. The first and second rails 111a and 111b may be arranged parallel to each other.

The first transporting tray 112 may be located on the first guide part 111. The first transporting tray 112 may connect the first and second rails 111a and 111b to each other. The first transporting tray 112 may be elongated in the first direction D1. The first transporting tray 112 may be moved along the first guide part 111 by a driving force exerted from the first driving part.

The second transporting unit 120 may be configured to move the head unit 200 in the first direction D1. The second transporting unit 120 may include a second guide part 121, a second transporting tray 122, and a second driving part (not shown).

The second guide part 121 may be provided on the first transporting tray 112. The second guide part 121 may be elongated in the first direction D1. The second guide part 121 may be provided in the form of a rail or groove.

The second transporting tray 122 may be provided on the second guide part 121. The second transporting tray 122 may be moved along the second guide part 121 by a driving force exerted from the second driving part. The first and second driving parts may include a linear motor or a stepping motor, but the inventive concept is not limited thereto.

The third transporting unit 130 may be configured to move the head unit 200 in the third direction D3. In addition, the third transporting unit 130 may also be configured to rotate the head unit 200. In some embodiments, the third transporting unit 130 may include a lift cylinder (not shown), which is used to move the head unit 200 in the third direction D3, and a rotary motor (not shown), which is used to rotate the head unit 200. For example, the third transporting unit 130 may be connected to a center of the connection plate 240 to rotate the connection plate 240. Accordingly, positions of the first and second head parts 210 and 220 may be changed.

The first supplying part 400 may be configured to supply the fluid to the head unit 200. For example, the first supplying part 400 may be used to supply the fluid, which is prepared to have the process temperature, to the first and second injection parts 211 and 212 of the first head part 210. In some embodiments the fluid may be a gas. For example, the fluid may contain nitrogen gas ($N_2$) or air. In other embodiments, the fluid may be a high pressure liquid (e.g., water) having the process temperature corresponding to the boiling point. Here, the expression "the process temperature corresponding to the boiling point" is used to mean that it is lower than a boiling point in a high pressure state and is higher than a boiling point in an atmospheric pressure state.

The first supplying part 400 may include a storage tank (not shown), which is used to store the fluid, and a heating unit (not shown), which is used to heat the fluid. The heating unit may be used to increase the temperature of the fluid to the process temperature.

The first supplying part 400 may be configured to supply the fluid, which is prepared to have the process temperature, to the first injection part 211. Hereinafter, the process temperature of the fluid supplied to the first injection part 211 will be referred to as a 'first process temperature'. In some embodiments, the first process temperature may be approximately uniform.

The first supplying part 400 may be configured to supply the fluid, which is prepared to have the process temperature, to the second injection part 212. Hereinafter, the process temperature of the fluid supplied to the second injection part 212 will be referred to as a 'second process temperature'. In some embodiments, the second process temperature may be different from the first process temperature. The second process temperature may be changed by the heating unit.

The second supplying part 500 may be configured to supply a shaping material to the head unit 200. For example, the second supplying part 500 may be configured to supply the shaping material to the second head part 220. The shaping material may be or include a metallic material and/or an organic material. For example, the metallic material may include at least one of silver (Ag), gold (Au), aluminum (Al), nickel-alloys, cobalt-chromium alloys, stainless steel, or titanium (Ti). The organic material may include at least one of plastics or synthetic resins.

The pressure supplying part 600 may be configured to exert a predetermined pressure on the first head part 210. The pressure supplying part 600 may include a first pressure supplying part 610 and a second pressure supplying part 620.

The first pressure supplying part 610 may be configured to exert a first pressure on the first injection part 211. Accordingly, the first injection part 211 may be used to inject the fluid with the first pressure. The first pressure may be approximately uniform.

The second pressure supplying part 620 may be configured to exert a second pressure on the second injection part 212. Accordingly, the second injection part 212 may be used to inject the fluid with second pressure. The second pressure may be higher than the first pressure. The second pressure supplying part 620 may be configured to allow the second pressure to be changed.

The controller 700 may be configured to control the head unit 200, the head transporting part 100, the first supplying part 400, the second supplying part 500, and the pressure supplying part 600. The controller 700 may be used to control a starting point of the injecting of the fluid using the first and second injection parts 211 and 212. The controller 700 may be used to control a starting point of a process of injecting the shaping material using the second head part 220.

With regard to the first and second injection parts 211 and 212, the second injection part 212 may be configured to inject the fluid toward the supporting structure 300 and/or the first output layer 20 with the second pressure. The second injection part 212 may include a second inlet 212b, to which the fluid from the second supplying part 500 is supplied, and a second nozzle 212a, from which the fluid is injected. The second nozzle 212a may be vertically overlapped with the second inlet 212b. In some embodiments, the second injection part 212 may be provided in the form of a pipe.

The first injection part 211 may be configured to inject the fluid toward the supporting structure 300 and/or the first output layer 20 with the first pressure. The first injection part 211 may be provided to enclose the second injection part 212. The first injection part 211 may include at least one first inlet 211b, to which the fluid from the first supplying part 400 is supplied, and a plurality of first nozzles 211a, from which the fluid is injected. The first inlet 211b may be connected to the first supplying part 400. At least one of the first nozzles 211a may be overlapped with the first inlet 211b, when viewed in a plan view. The first nozzles 211a may be spaced apart from the first inlet 211b in a direction toward the supporting structure 300. The first nozzles 211a may be arranged along the circumference of the second nozzle 212a. Accordingly, the first nozzles 211a and the second nozzle 212a may not be overlapped with each other. An injection area of the fluid injected from the first injection part 211 may be larger than that of the fluid injected from the second injection part 212. Here, the injection area may refer to an area of a region covered with the fluid. That is, the injection area of the fluid injected with the first pressure may be larger than the injection area of the fluid injected with the second pressure. A diameter of each of the first nozzles 211a may be smaller than that of the second nozzle 212a.

Figure 5:
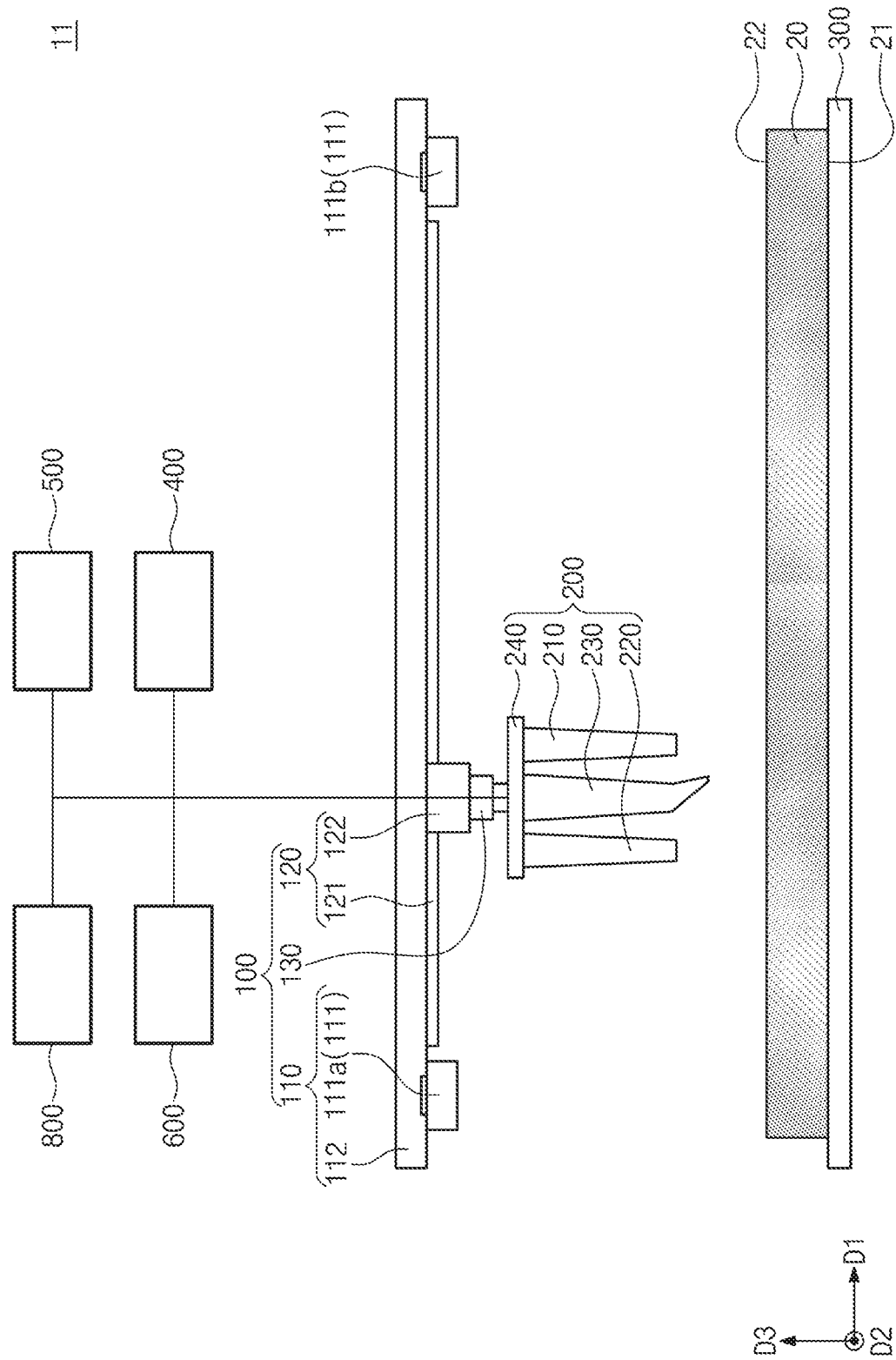
FIG. 5 is a schematic diagram illustrating another 3D structure manufacturing system modified from that shown in FIG. 1A.
Figure 6:
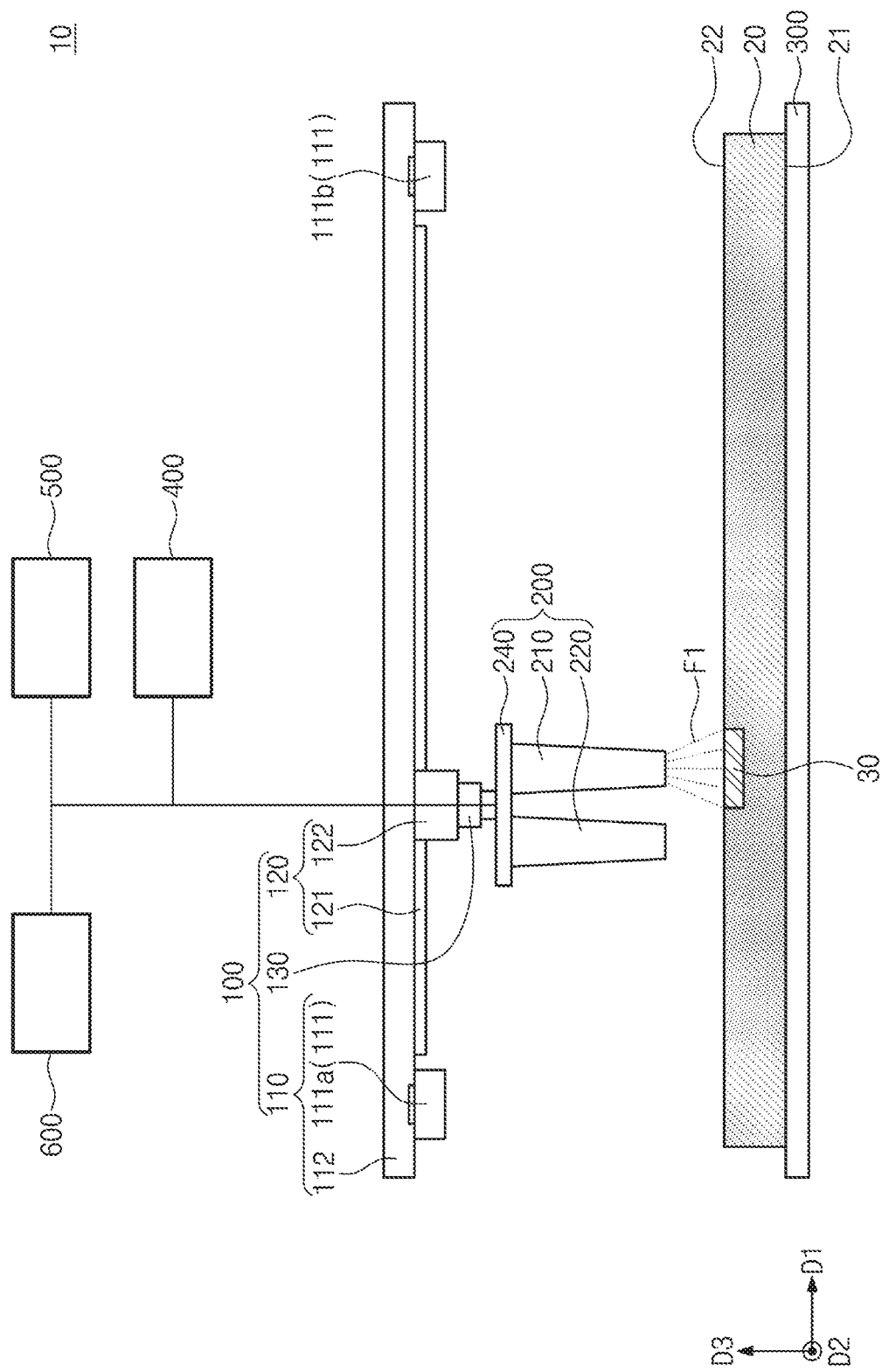
FIGS. 6 to 13 are diagrams schematically illustrating a process of manufacturing a 3D structure using the 3D structure manufacturing system of FIGS. 1A and 1B.
Figure 7:
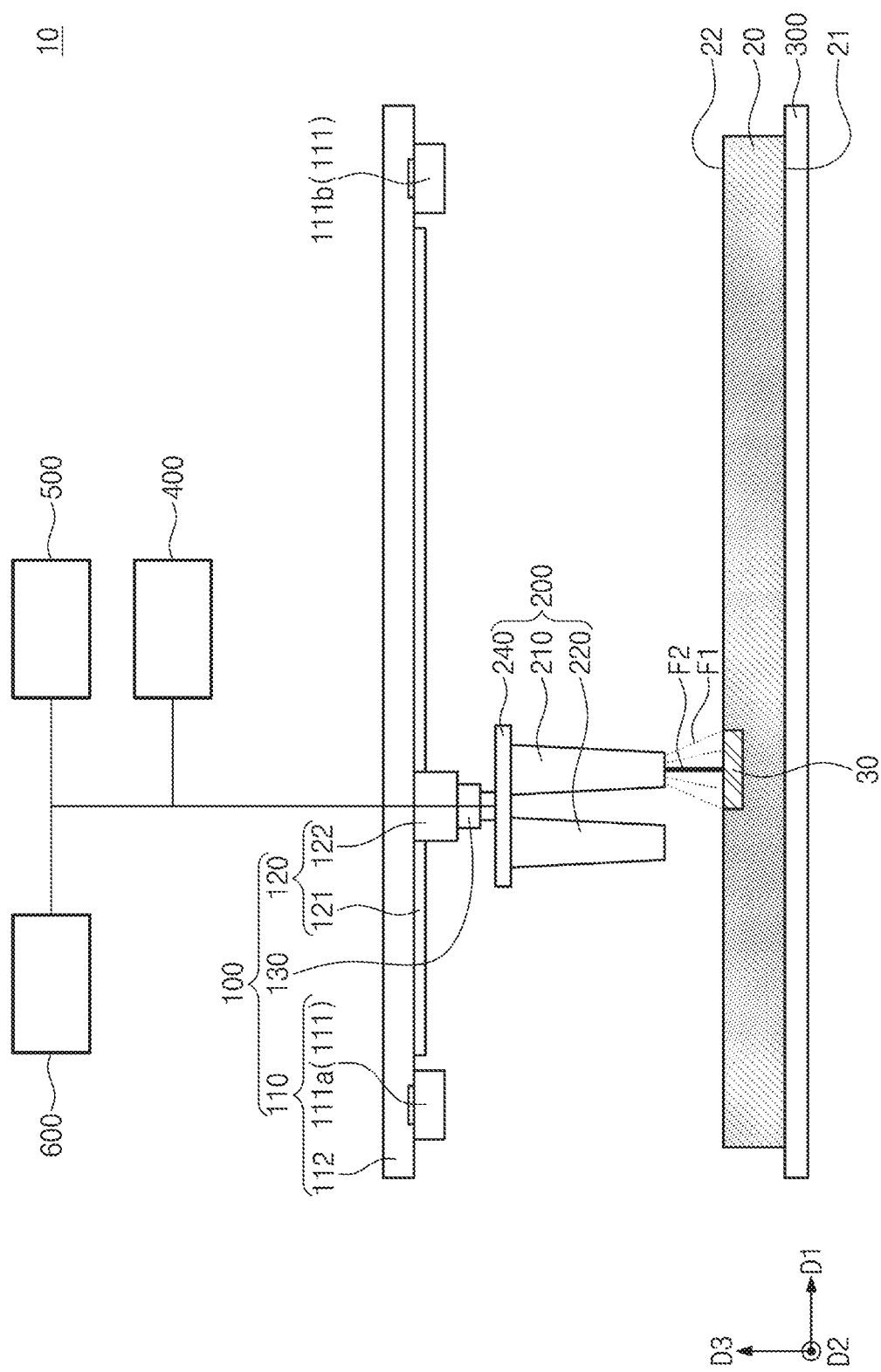

FIG. 5 is a schematic diagram illustrating another 3D structure manufacturing system modified from that shown in FIG. 1A. In the following description, an element previously described with reference to FIGS. 1A, 1B, 2, 3, and 4 may be identified by a similar or identical reference number without repeating an overlapping description thereof, for the sake of brevity.

Referring to FIG. 5, a 3D structure manufacturing system 11 may include the supporting structure 300, the head unit 200, the head transporting part 100, the first supplying part 400, the second supplying part 500, the pressure supplying part 600, and the controller 700 (e.g., see FIG. 2). Unlike the 3D structure manufacturing system 10 of FIG. 1A, the 3D structure manufacturing system 11 of FIG. 5 may further include a third supplying part 800. Unlike the head unit 200 of FIG. 1A, the head unit 200 of FIG. 5 may further include a third head part 230.

The second supplying part 500 may be configured to provide a metallic material to the second head part 220. Thus, the second head part 220 may be used to inject the metallic material toward the supporting structure 300.

The third supplying part 800 may be configured to supply a solution containing metal particles to the head unit 200. For example, the third supplying part 800 may be used to provide the solution containing metal particles to the third head part 230. The metal particles may be formed of or include at least one of silver (Ag), gold (Au), or titanium (Ti). The metal particles may be formed of or include the same metal as the metallic material injected from the second head part 220, but the inventive concept is not limited thereto.

The third head part 230 may be connected to the connection plate 240. The third head part 230 may be positioned between the first and second head parts 210 and 220. The first head part 210, the second head part 220, and the third head part 230 may be arranged along the circumference of the circular connection plate 240. The third head part 230 may be configured to inject the solution onto the first output layer 20, to which the fluid is injected.

Figure 14:
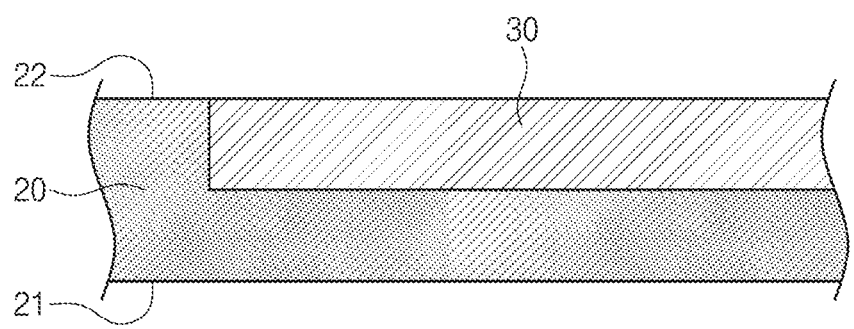
FIGS. 14 to 16 are enlarged sectional views illustrating portions of first output layers respectively shown in FIGS. 6 to 8.
Figure 15:
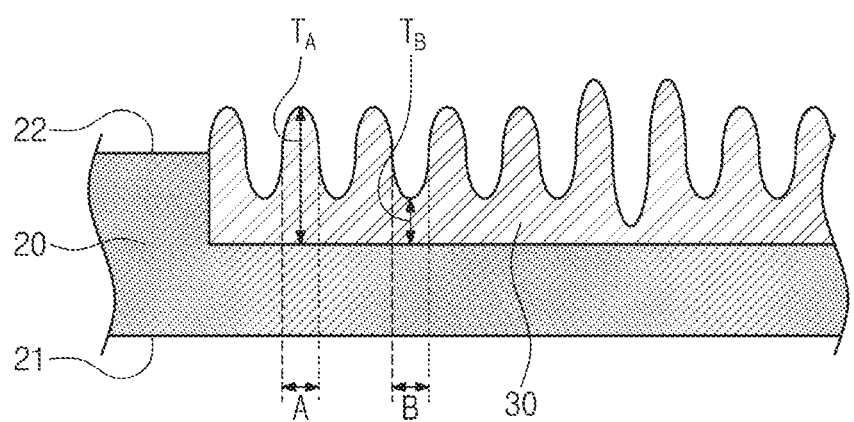
Figure 16:
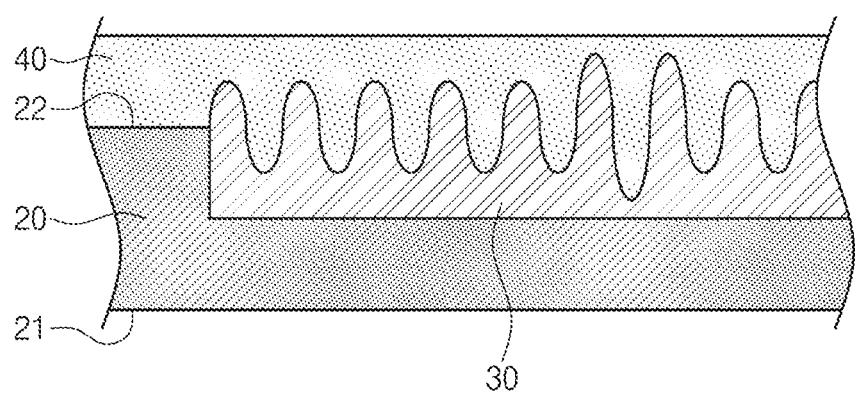

FIGS. 6 to 13 are diagrams schematically illustrating a process of forming a 3D structure on a first output layer using the 3D structure manufacturing system of FIGS. 1A and 1B. FIG. 14 is an enlarged sectional view illustrating a portion of the first output layer shown in FIG. 6. FIG. 15 is an enlarged sectional view illustrating a portion of the first output layer shown in FIG. 7. FIG. 16 is an enlarged sectional view illustrating a portion of the first output layer shown in FIG. 8.

Referring to FIGS. 1A, 4, 6, and 14, the second head part 220 may be used to inject a shaping material M onto the supporting structure 300. For example, the second head part 220 may be moved in the first and second directions D1 and D2 while injecting the shaping material M. Accordingly, the first output layer 20 may be formed on the supporting structure 300. The first output layer 20 may be formed in a substantially rectangular shape, when viewed in a plan view.

Figure 9:
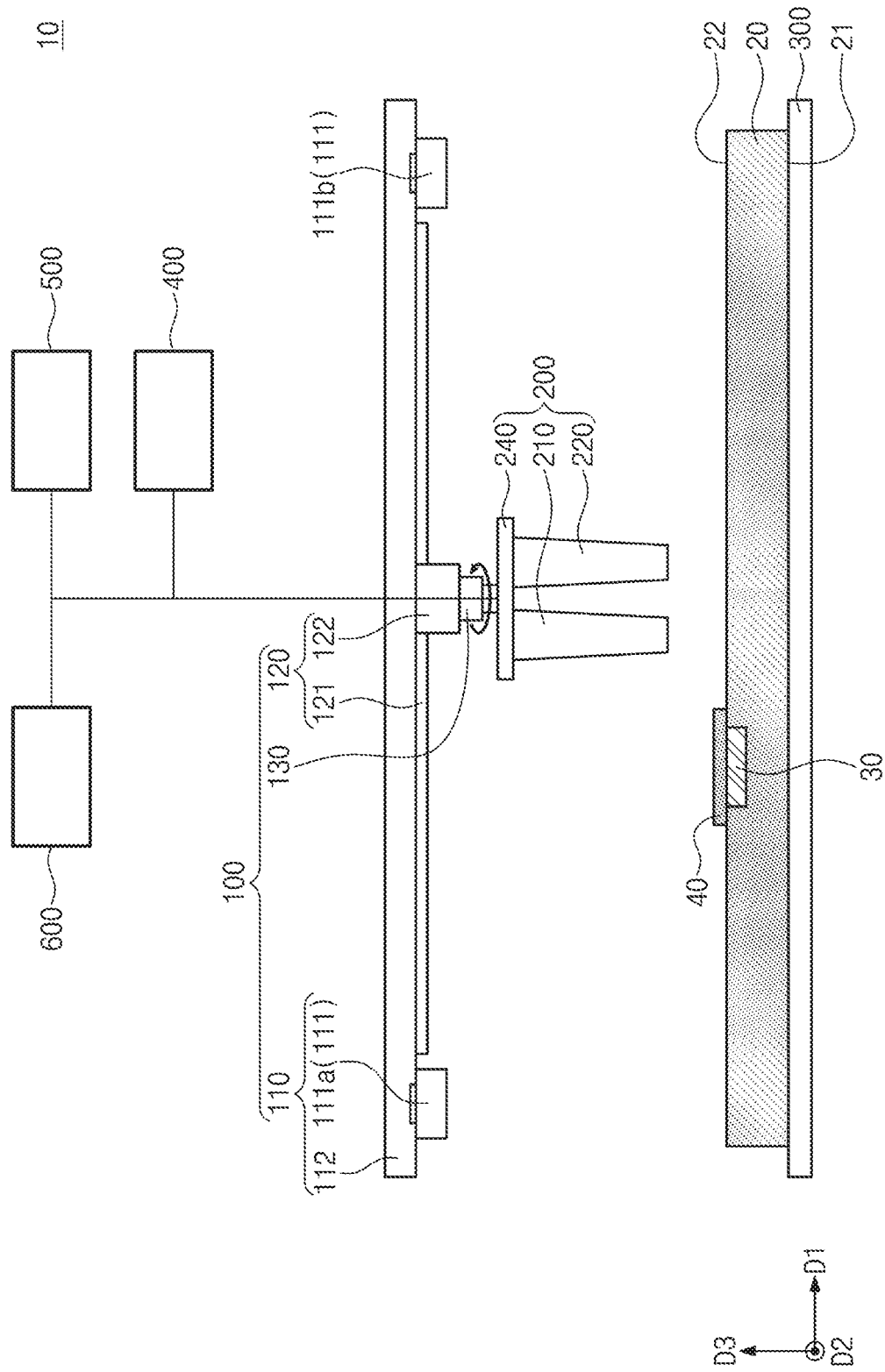

When the process of forming the first output layer 20 on the supporting structure 300 is finished, the head unit 200 may be moved in the first direction D1. Here, the first head part 210 may be positioned in the first direction D1 relative to the second head part 220. The first injection part 211 of the first head part 210 may inject a fluid F1 toward the surface of the first output layer 20 with the first pressure. For example, the first injection part 211 may inject the fluid F1 in a spray manner. The fluid F1 injected from the first injection part 211 may fall to the surface of the first output layer 20. As described above, the fluid F1 may have the process temperature. Thus, the first output layer 20, which is in contact with the fallen fluid F1, may be softened. In other words, a softening layer 30 may be formed in the first output layer 20. As shown in FIG. 9, the softening layer 30 may have a substantially flat surface.

Referring to FIGS. 1A, 4, 7, and 15, the second injection part 212 of the first head part 210 may be used to inject a fluid F2 toward the softening layer 30 with the second pressure. As described above, the second pressure may be higher than the first pressure. Thus, the softening layer 30 may have an uneven surface.

In some embodiments, the second injection part 212 may be used to inject the fluid F2. During the injection of the fluid F1 at the first pressure using the first injection part 211, the second injection part 212 may inject the fluid F2 with the second pressure. In certain embodiments, the first injection part 211 may not inject the fluid F1, when the fluid F2 is injected from the second injection part 212.

During the movement of the head unit 200 in the first direction D1, the second injection part 212 may inject the fluid F2 with the second pressure at regular intervals. Referring to FIG. 15, if the fluid is injected from the second injection part 212 in this manner, protruding regions A and recessed regions B may be alternately formed in the softening layer 30. For example, the recessed regions B may be formed by the fluid F2 injected with the second pressure. The protruding regions A may be formed at regions, to which the fluid F2 with the second pressure is not injected, and may be positioned adjacent to the recessed regions B, respectively.

Each of the protruding regions A may have a shape protruding from the second surface 22 of the first output layer 20 toward the head unit 200. Each of the recessed regions B may have a shape that is recessed from the second surface 22 of the first output layer 20 toward the first surface 21. Accordingly, the protruding regions A may have a thickness TA that is greater than a thickness TB of the recessed regions B. Here, the thickness may be a length of the softening layer 30 measured in the third direction D3.

In some embodiments, the second pressure may be changed during the injection of the fluid F2 using the second injection part 212. Accordingly, any one of the recessed regions B may have a thickness that is different from thicknesses of the others. The higher the second pressure, the smaller the thickness TB of the recessed regions B. The higher the second pressure, the larger the thickness TA of the protruding region A.

Referring to FIGS. 1A, 4, 8, and 16, the head transporting part 100 may be used to move the head unit 200 in the first direction D1. For example, the head transporting part 100 may be used to move the head unit 200 toward the second rail 111b. During such movement of the head unit 200, the second head part 220 may inject the shaping material M toward the second surface 22 of the first output layer 20 and the uneven surface of the softening layer 30. The shaping material M may be formed to cover the uneven surface of the softening layer 30 and the second surface 22 of the first output layer 20 adjacent thereto. As a result, a second output layer 40 may be formed on the first output layer 20 and the softening layer 30. The softening layer 30 may be vertically overlapped with the second output layer 40.

Due to the uneven structure of the softening layer 30, the second output layer 40 and the softening layer 30 may be in contact with each other with an increased contact area. Accordingly, an adhesion strength between the first output layer 20 and the second output layer 40 may be increased.

Referring to FIGS. 1A, 4, and 9, the head unit 200 may be moved in the first direction D1. Thus, the second head part 220 may be moved to a position that is not overlapped with the softening layer 30. The head transporting part 100 may rotate the head unit 200. For example, the third transporting unit 130 may be used to rotate the connection plate 240 by about 180°. In this case, the second head part 220 may be positioned in the first direction D1 relative to the first head part 210.

Figure 10:
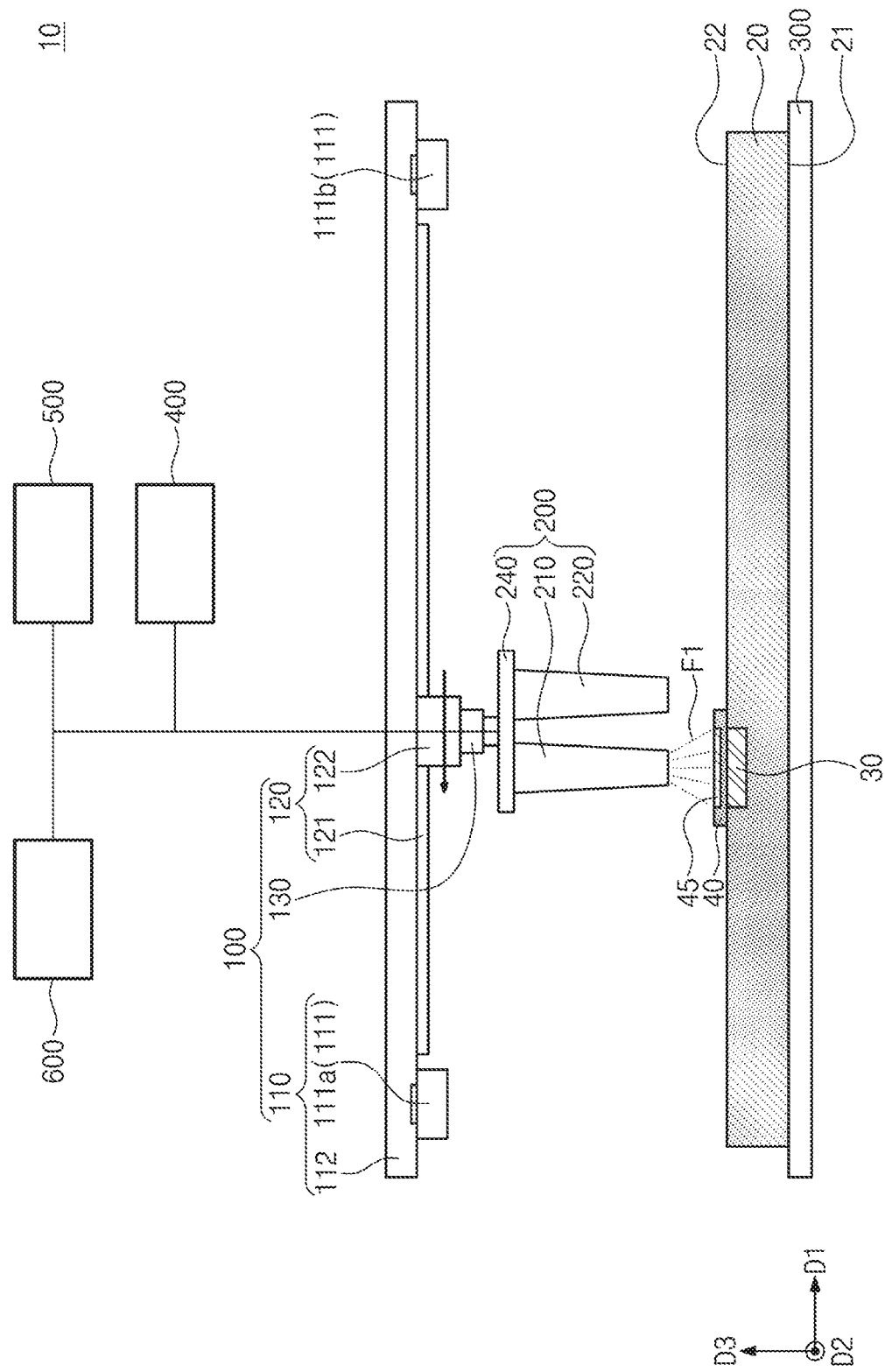

Referring to FIGS. 1A, 4, and 10, the head unit 200 may be moved in a direction opposite to the first direction D1 by the head transporting part 100. Accordingly, the first head part 210 may be positioned on the second output layer 40. The first injection part 211 of the first head part 210 may be used to inject the fluid F1 toward the second output layer 40, and thus, a softening layer 45 (hereinafter, a second softening layer) may be formed in the second output layer 40. In some embodiments, the second softening layer 45 may be overlapped with the softening layer 30 of the first output layer 20, when viewed in a plan view.

Figure 11:
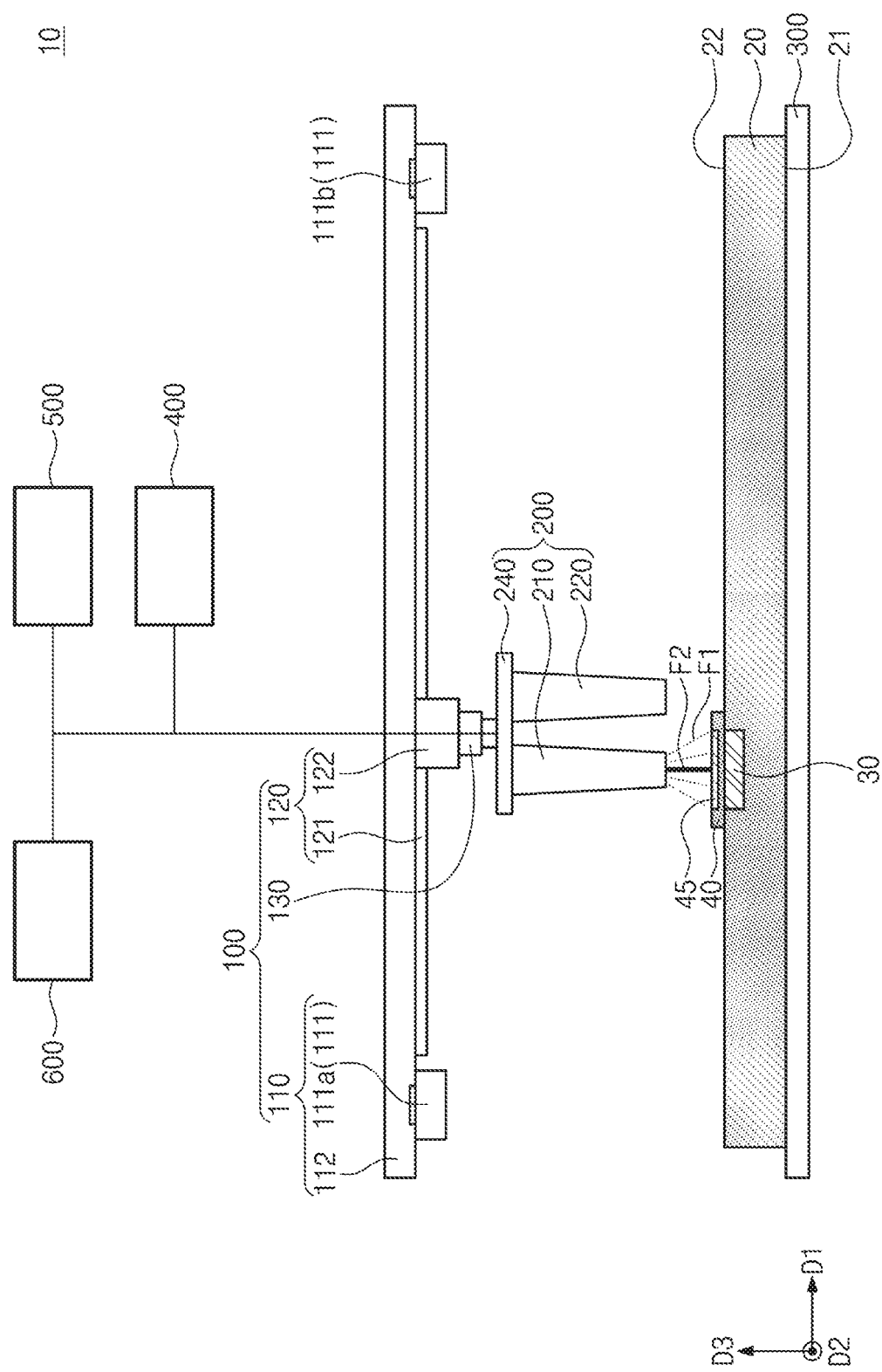

Referring to FIGS. 1A, 4, and 11, the second injection part 212 may be used to inject the fluid F2 with the second pressure toward the second softening layer 45. Accordingly, the second softening layer 45 may have an uneven surface. The head unit 200 may move in the direction opposite to the first direction D1, when the fluid F2 is injected from the second injection part 212. In some embodiments, the fluid F2 may be injected from the second injection part 212, when the fluid F1 is injected from the first injection part 211.

Figure 12:
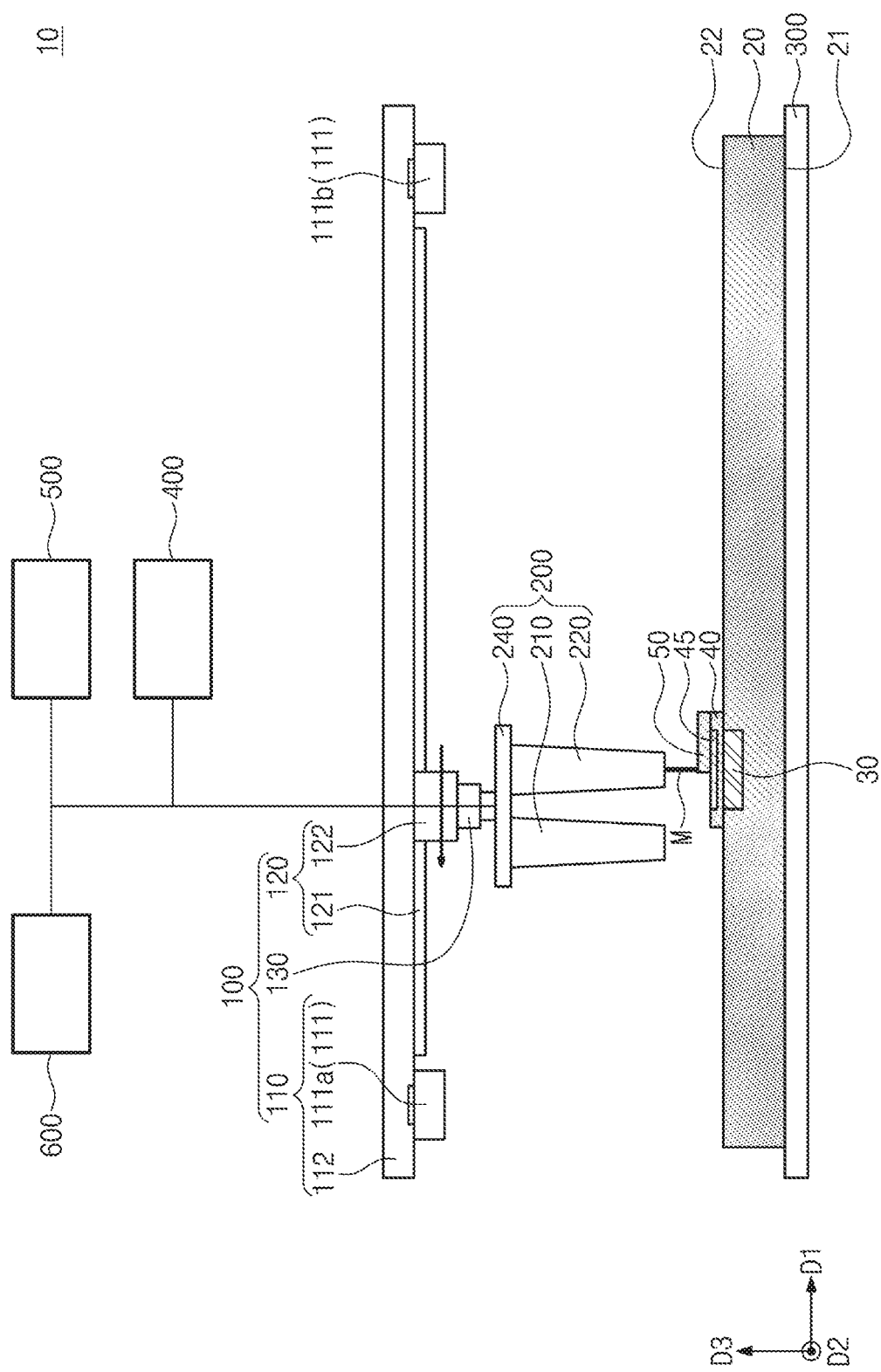

Referring to FIGS. 1A, 4, and 12, the head unit 200 may be moved in the direction opposite to the first direction D1 by the head transporting part 100. Accordingly, the second head part 220 may be used to inject the shaping material M toward the second output layer 40. The shaping material M may be formed to cover the uneven surface of the second softening layer 45 and the second output layer 40. As a result, a third output layer 50 may be formed on the second output layer 40. The second and third output layers 40 and 50 may be overlapped with each other, when viewed in a plan view.

Figure 13:
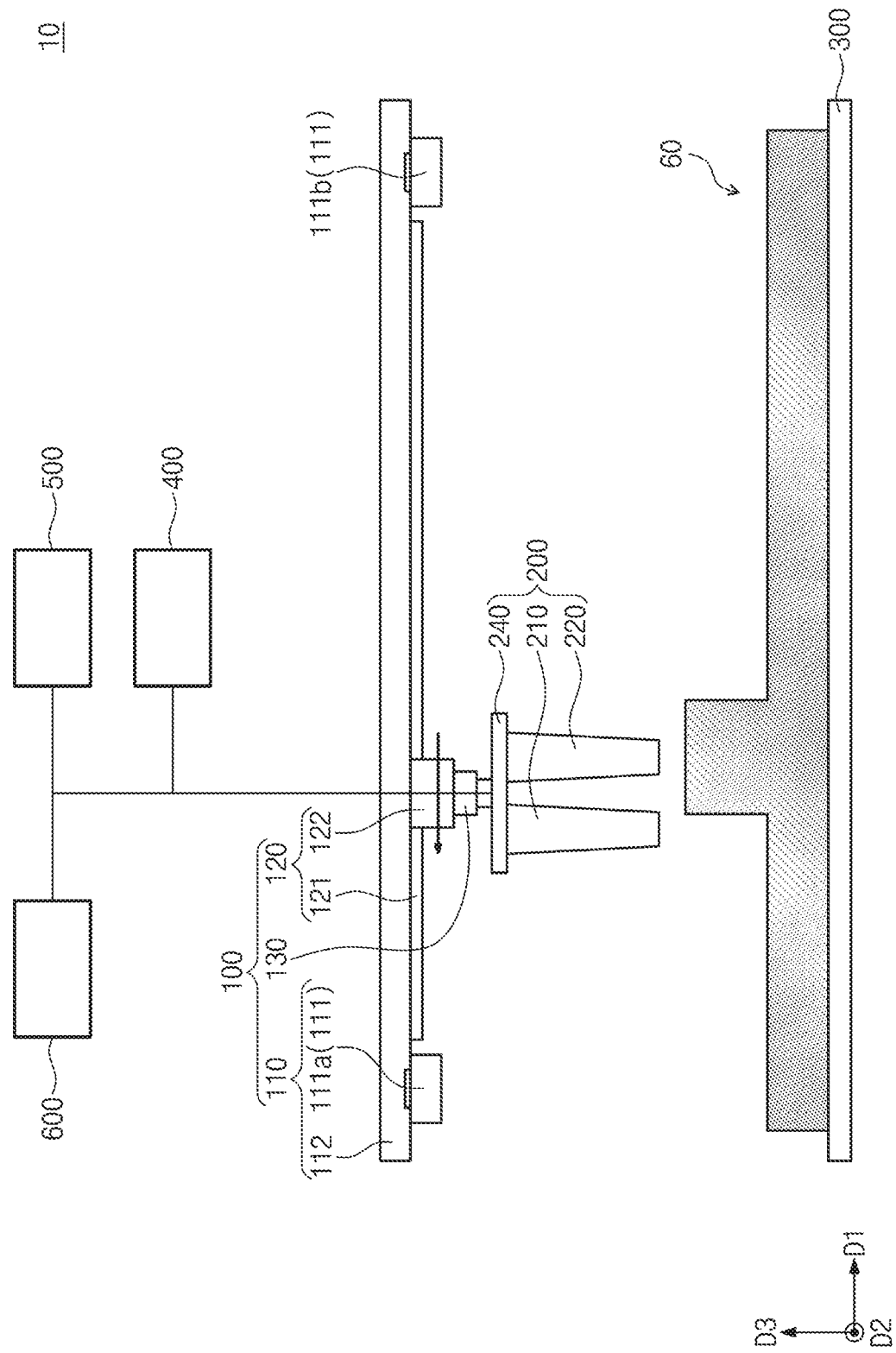

Referring to FIGS. 1A, 4, and 13, the steps described with reference to FIGS. 6 to 12 may be repeated. Accordingly, a 3D structure 60 may be formed on the supporting structure 300. The 3D structure 60 may include a plurality of output layers (e.g., the second and third output layers 40 and 50) stacked on the first output layer 20 (e.g., see FIG. 12). In some embodiments, the 3D structure 60 may be formed to have a three-dimensional structure.

Figure 21:
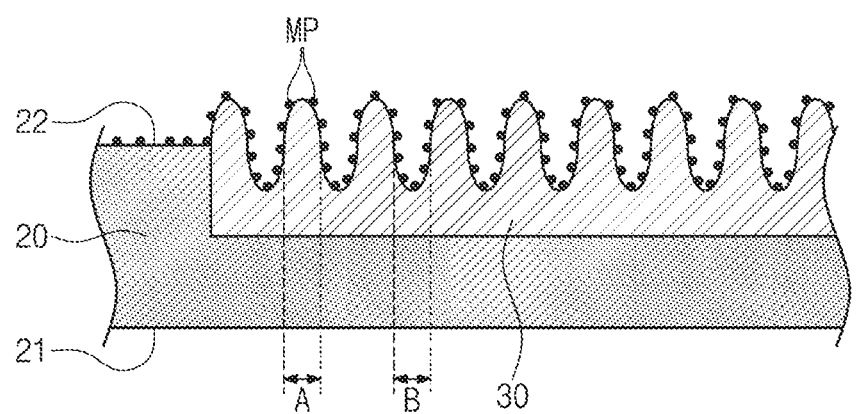
FIGS. 21 and 22 are enlarged sectional views illustrating portions of first output layers respectively shown in FIGS. 19 and 20.
Figure 22:
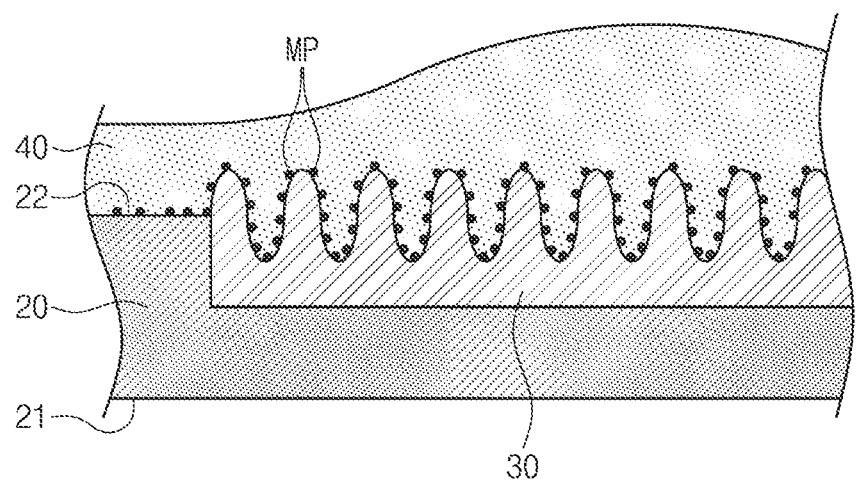

FIGS. 17 to 20 are schematic diagrams illustrating a process of manufacturing a 3D structure using the 3D structure manufacturing system of FIG. 5. FIGS. 21 and 22 are enlarged sectional views illustrating portions of first output layers respectively shown in FIGS. 19 and 20. In the following description, an element previously described with reference to FIGS. 6 to 15 may be identified by a similar or identical reference number without repeating an overlapping description thereof, for the sake of brevity.

Figure 17:
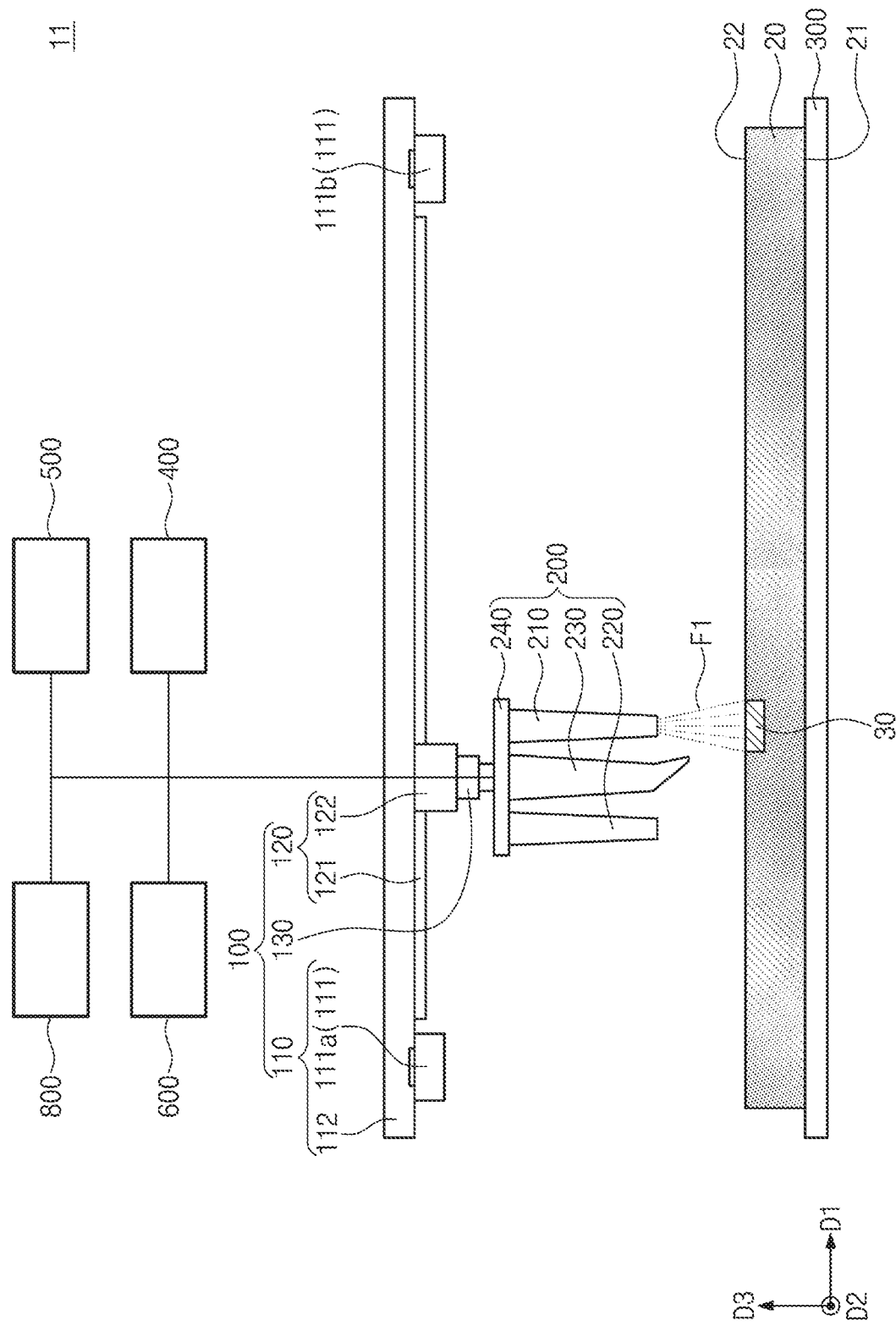
FIGS. 17 to 20 are schematic diagrams illustrating a process of manufacturing a 3D structure using the 3D structure manufacturing system of FIG. 5.
Figure 18:
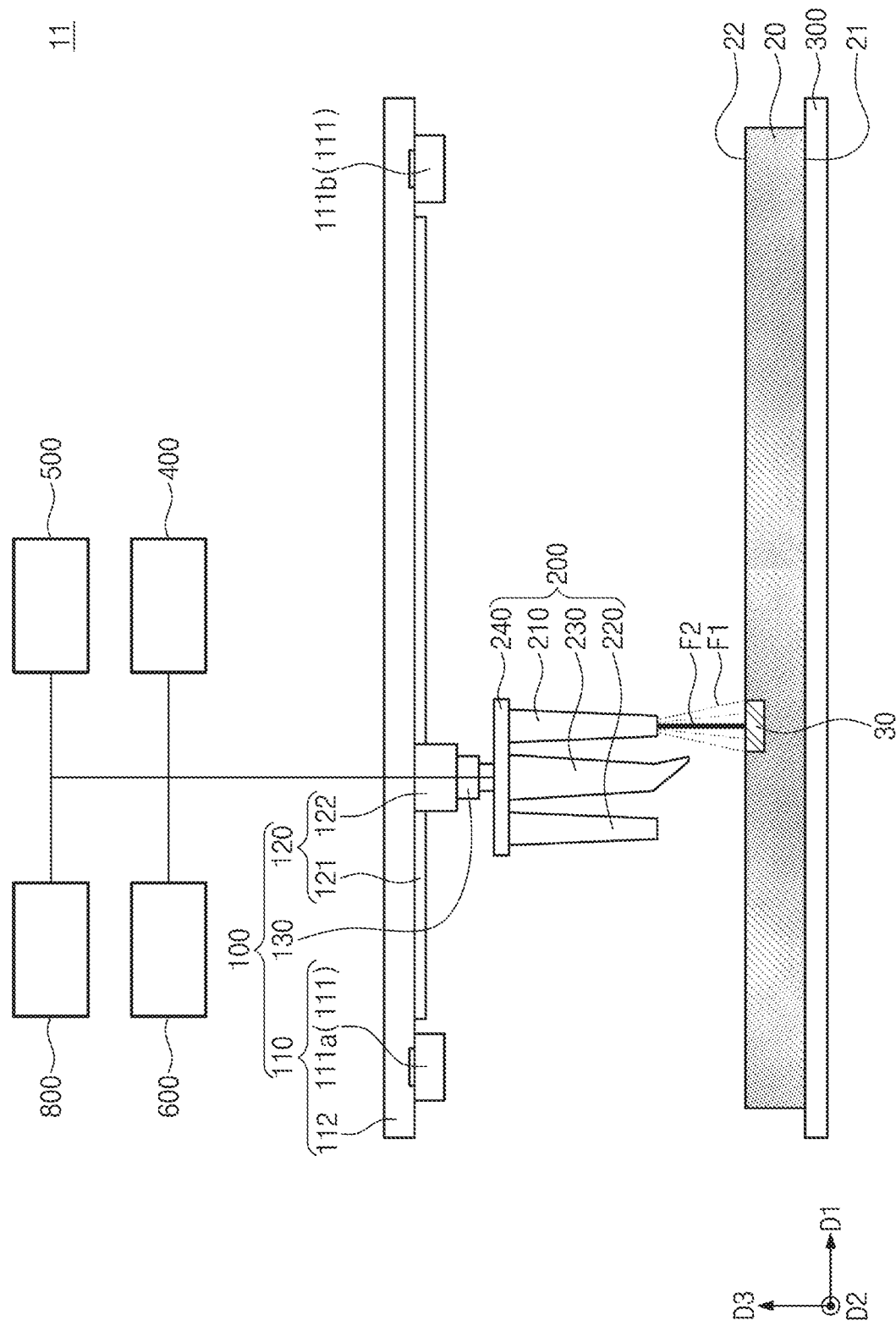
Figure 19:
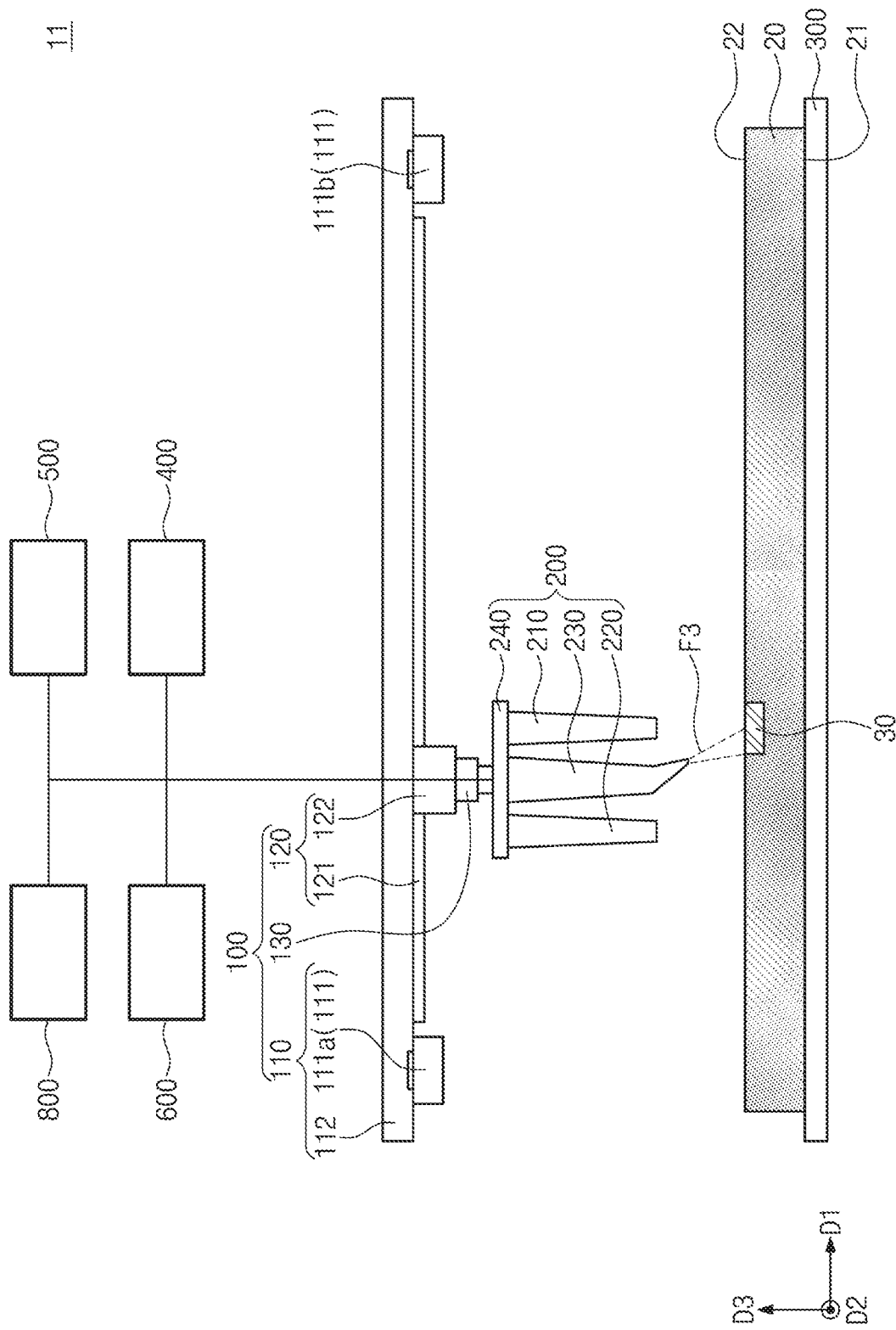
Figure 20:
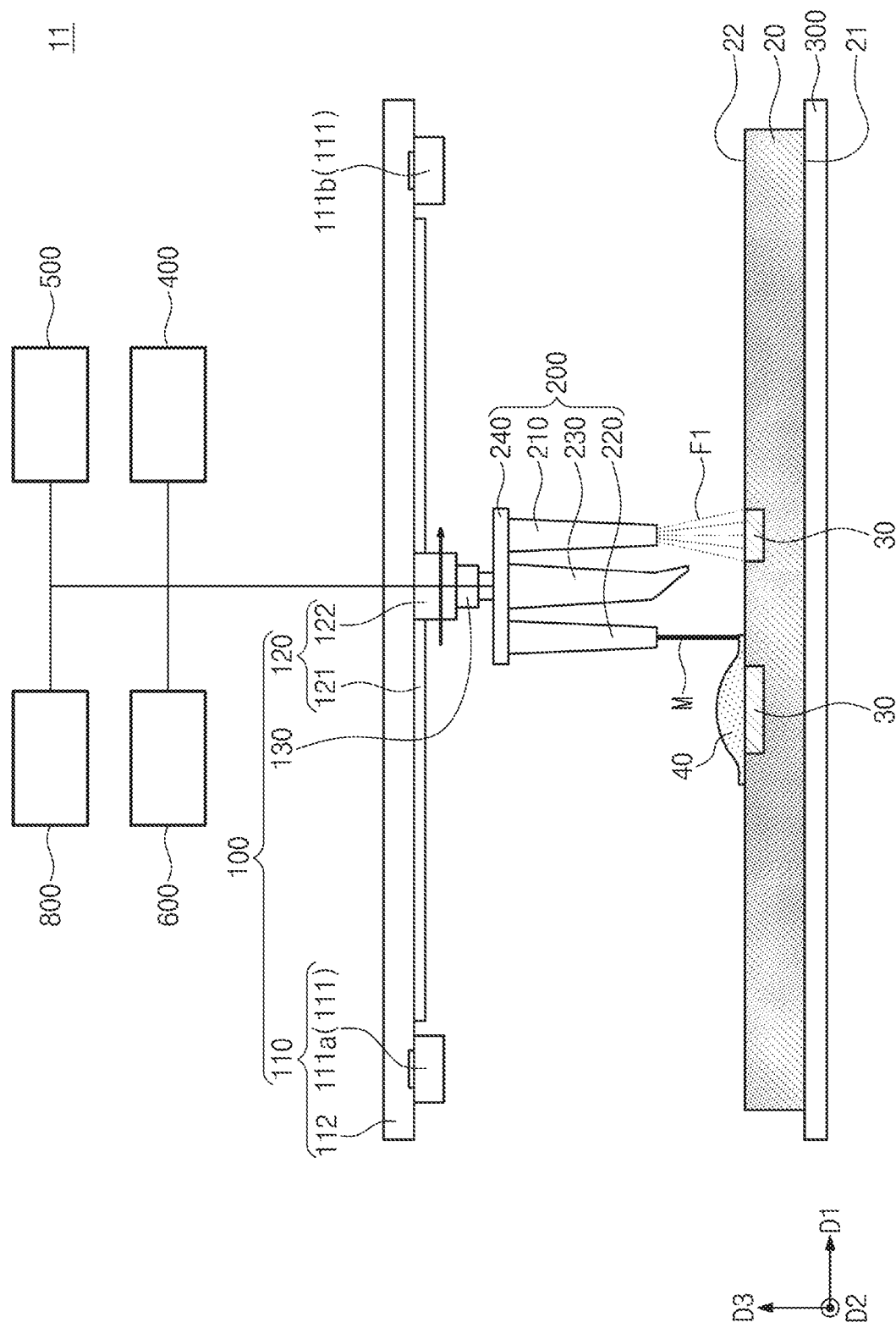

Referring to FIGS. 3, 5, and 17, the first injection part 211 may be used to inject the fluid F1 with the first pressure toward the surface of the first output layer 20. As a result, the softening layer 30 may be formed in the first output layer 20. The second head part 220 may not inject the shaping material. The third head part 230 may not inject the solution.

Referring to FIGS. 3, 5, 14, and 18, the second injection part 212 of the first head part 210 may be used to inject the fluid F2 with the second pressure toward the softening layer 30. Thus, the softening layer 30 may have an uneven surface.

Referring to FIGS. 3, 5, 19, and 21, the third head part 230 may be used to inject a solution F3, in which metal particles MP are contained, toward the uneven surface of the softening layer 30 and/or the surface of the first output layer 20. As shown in FIG. 21, the metal particles MP may be placed on the uneven surface of the softening layer 30 and/or the surface of the first output layer 20. For example, the metal particles MP may be plugged or stuck into the recessed regions B, the protruding regions A and the second surface 22 of the first output layer 20.

Referring to FIGS. 3, 5, 20, and 21, the head transporting part 100 may be used to move the head unit 200 in the first direction D1. When the head transporting part 100 is moved in the first direction D1, the fluid F1 and a solvent (e.g., see F3 in FIG. 19) may not be injected from the first and third head parts 210 and 230. When the head transporting part 100 is moved in the first direction D1, the second head part 220 may inject the shaping material M toward the uneven surface of the softening layer 30. When the second head part 220 is moved in the first direction D1, an amount of the shaping material M injected from the second head part 220 may be changed. Thus, the second output layer 40 may be formed to have a convex shape in the third direction D3.

In some embodiments, the shaping material M may be or include a metallic material, similar to the metal particles MP. For example, the shaping material M and the metal particles MP may be formed of or include the same metallic material. The shaping material M and the metal particles MP may be bonded to each other. In this case, an adhesion strength between the first output layer 20 and the second output layer 40 may be increased. This make it possible to improve durability of the 3D structure 60 (e.g., see FIG. 13).

According to some embodiments of the inventive concept, it may be possible to increase an adhesion strength between a plurality of output layers. This make it possible to improve durability of the 3D structure.

While example embodiments of the inventive concepts have been particularly shown and described, it will be understood by one of ordinary skill in the art that variations in form and detail may be made therein without departing from the spirit and scope of the attached claims.

What is claimed is:
1. A system for manufacturing a three-dimensional structure, comprising:
   a supporting structure;
   a head unit spaced apart from the supporting structure;
   a head transporting part configured to move the head unit over the supporting structure;
   a first supplying part configured to supply a fluid to the head unit; and
   a second supplying part configured to supply a shaping material to the head unit, wherein the head unit comprises:

a first head part configured to inject the fluid toward the supporting structure with a first pressure and a second pressure higher than the first pressure; and a second head part configured to supply the shaping material toward the supporting structure;

wherein the first head part comprises:

a first injection part configured to inject the fluid with the first pressure toward the supporting structure; and a second injection part configured to inject the fluid with the second pressure toward the supporting structure, wherein the first injection part is provided to enclose the second injection part; and wherein the first injection part comprises at least one first inlet, which is connected to the first supplying part, and a plurality of first nozzles, which are spaced apart from the first inlet in a direction toward the supporting structure, the second injection part comprises a second inlet, which is connected to the first supplying part, and a second nozzle, which is spaced apart from the second inlet in the direction toward the supporting structure, and the second inlet and the second nozzle are vertically overlapped with each other.

2. The system of claim 1, further comprising a third supplying part configured to supply solution, in which a metallic material is contained, to the head unit, wherein the head unit further comprises a third head part configured to inject the solution toward the supporting structure.

3. The system of claim 1, wherein the fluid has a temperature ranging from a softening point of the shaping material to a melting point of the shaping material.

4. The system of claim 1, wherein the head unit further comprises a circular-disk shaped connection plate connecting the first and second head parts to the head transporting part, and the head transporting part is configured to rotate the connection plate.

5. The system of claim 1, wherein the first injection part comprises a first side and a second side, and the second injection part includes a pipe located between the first side and second side.

6. The system of claim 5, wherein the first side and the second side taper in a direction from respective first inlets toward respective first nozzles, the pipe has a constant diameter that is smaller than respective diameters of the first side and the second side, and has a second nozzle, and the first nozzles are arranged about a circumference of the second nozzle.

7. The system of claim 6, wherein each of the first nozzles has a smaller diameter than a diameter of the second nozzle.

* * * * *